US009932112B1

(12) United States Patent
Harms et al.

(10) Patent No.: US 9,932,112 B1
(45) Date of Patent: Apr. 3, 2018

(54) CARGO HANDLING SYSTEM AND CONTROL METHOD

(71) Applicant: Goodrich Corporation, Charlotte, NC (US)

(72) Inventors: Scott Harms, Ypsilanti, ND (US); Shad Kish, Jamestown, ND (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 15/466,334

(22) Filed: Mar. 22, 2017

(51) Int. Cl.

| | |
|---|---|
| ***B64D 9/00*** | (2006.01) |
| ***G06K 7/10*** | (2006.01) |
| ***B65G 13/02*** | (2006.01) |
| ***G05B 19/042*** | (2006.01) |

(52) U.S. Cl.
CPC ............... *B64D 9/00* (2013.01); *B65G 13/02* (2013.01); *G05B 19/042* (2013.01); *G06K 7/10366* (2013.01); *B64D 2009/006* (2013.01); *B65G 2203/046* (2013.01); *G05B 2219/21028* (2013.01); *G05B 2219/21053* (2013.01); *G05B 2219/2621* (2013.01)

(58) Field of Classification Search
CPC ............................ B64D 2009/006; B64D 9/00
See application file for complete search history.

(56) References Cited

U.S. PATENT DOCUMENTS 3,709,450 A * 1/1973 Watts ........................ B64D 9/00 244/137.3
5,267,709 A * 12/1993 Koharcheck .............. B64C 1/22 198/573
5,660,268 A * 8/1997 Paauwe .................... B64D 9/00 198/782
5,716,028 A * 2/1998 Evans ...................... B64D 9/00 244/137.1
7,195,159 B2 * 3/2007 Sloan ................. G06K 7/10445 235/375
7,198,227 B2 4/2007 Olin et al.
7,764,191 B2 * 7/2010 Hall ..................... G05B 19/042 340/12.51
8,109,702 B2 * 2/2012 Stegmiller ............... B64D 9/00 193/35 B
8,260,948 B2 * 9/2012 Chand .................... G06Q 30/06 340/10.1
8,308,107 B2 * 11/2012 Hettwer ................... B64D 9/00 244/118.1
8,515,656 B2 * 8/2013 Reed ........................ B64D 9/00 244/137.1
8,925,867 B2 1/2015 Schnorwangen et al.
9,014,840 B2 4/2015 Scherenberger et al.
2009/0167502 A1 * 7/2009 Erickson ............. G06K 7/0008 340/10.3
2011/0169606 A1 * 7/2011 Brandsma ............. G05B 15/02 340/9.1

(Continued)

*Primary Examiner* — Thomas Randazzo
(74) *Attorney, Agent, or Firm* — Snell & Wilmer, L.L.P.

(57) ABSTRACT

A cargo handling system may have power drive unit (PDU), which may include a motor and a PDU controller. The PDU controller may be in communication with the motor and configured to receive a command signal including an address corresponding to a location of the PDU. The PDU controller may comprise a radio frequency identification (RFID) reader. The PDU controller may be configured to determine the location of the PDU by reading an RFID tag.

20 Claims, 7 Drawing Sheets

B A' 106 108 114 110 112 140 104 A 116 B'

106 142 144 146 104

(56) References Cited

U.S. PATENT DOCUMENTS

| | | | | |
|---|---|---|---|---|
| 2011/0285534 | A1* | 11/2011 | Seo | G05B 19/042 340/572.1 |
| 2015/0225082 | A1* | 8/2015 | Levron | B64D 9/00 244/137.1 |
| 2016/0117536 | A1* | 4/2016 | Johnsen | G06K 7/10366 340/3.1 |
| 2016/0214436 | A1* | 7/2016 | Purushothaman, Sr. | B60C 7/10 |
| 2017/0103241 | A1* | 4/2017 | Yamada | H02M 5/4585 |

* cited by examiner

CARGO HANDLING SYSTEM AND CONTROL METHOD

FIELD

The present disclosure relates generally to cargo handling systems, and, more specifically, to power drive units.

BACKGROUND

Conventional aircraft cargo systems typically include various tracks and rollers that span the length of an aircraft. Cargo may be loaded from an aft position on an aircraft and conducted by the cargo system to a forward position and/or, depending upon aircraft configuration, cargo may be loaded from a forward position on an aircraft and conducted by the cargo system to an aft position. Cargo systems, such as those used by aircraft for transport of heavy containerized cargo or pallets, also referred to as unit load devices (ULDs), typically include roller trays containing transport rollers which rollably support the cargo. Motor driven rollers are typically employed in these systems. Aircraft often employ a series of motor driven power drive units (PDUs) to propel cargo containers and pallets within the aircraft cargo compartment. This configuration can allow for the transportation of cargo pallets within the aircraft cargo compartment by one or more operators controlling the PDUs.

SUMMARY

Systems and methods for cargo handling are disclosed herein. A cargo handling system may comprise a PDU having a motor and a PDU controller in communication with the motor. The PDU controller may be configured to receive a command signal including an address corresponding to a location of the PDU. The PDU controller may comprise a radio frequency identification (RFID) reader. The PDU controller may be configured to determine the location of the PDU by reading an RFID tag.

In various embodiments, the PDU controller may be configured to determine whether the address included in the command signal matches the location of the PDU. The PDU controller may be configured to command the motor in response to the location of the PDU matching the address included in the command signal. The PDU controller may be configured to disregard the command signal in response to the location of the PDU being different than the address included in the command signal. The RFID tag may operate at a frequency having a read range of up to one meter. The PDU may further comprise a connector coupled to the PDU controller. The connector may be configured to couple to a wiring harness having pin programming.

A cargo handling system may comprise a tray and a first RFID tag coupled to the tray. The first RFID tag may include a location information identifying a location of the tray. A first PDU may be disposed in the tray. The first PDU may comprise a first PDU controller. A first tangible, non-transitory memory may be configured to communicate with the first PDU controller. The first tangible, non-transitory memory may have instructions stored thereon that, in response to execution by the first PDU controller, may cause the first PDU controller to perform operations which may comprise the steps of receiving, by the first PDU controller, a command signal including a first address corresponding to a location of the first PDU, reading, by the first PDU controller, a first RFID tag to determine the location of the first PDU, and determining, by the first PDU controller, whether the location of the first PDU matches the first address included in the command signal In various embodiments, the first PDU may further include a first motor coupled to the first PDU controller. The motor may be coupled to a drive roller. The operations may further comprise commanding, by the first PDU controller, a motor of the first PDU according to the command signal in response the first PDU determining that the first address included in the command signal matches the location of the first PDU. A connector may be coupled to the first PDU controller, the connector configured to couple to a wiring harness having pin programming. The first PDU controller may comprise an RFID reader. A ferrite pad may be disposed between the tray and the first RFID tag. The first RFID tag may operate at a frequency having a read range of up to one meter. A second PDU may have a second PDU controller. A second tangible, non-transitory memory may be configured to communicate the second PDU controller. The second tangible, non-transitory memory having instructions stored thereon that, in response to execution by the second PDU controller, may cause the second PDU controller to perform operations, which may comprise the steps of reading, by the second PDU controller, a second RFID tag to determine a location of the second PDU, determining, by the second PDU controller, the location of the second PDU is different than the first address included in the command signal, and disregarding, by the second PDU controller, the command signal in response to determining that the location of the second PDU is different than the first address included in the command signal.

A method of controlling a cargo handling system is also provided. The method may comprise the step of sending, by a controller, a command signal to a first PDU controller and a second PDU controller. The command signal may include a first address corresponding to a location of a first PDU having the first PDU controller. The method may comprise the steps of reading, by the first PDU controller, a first RFID tag to determine the location of the first PDU, determining, by the first PDU controller, the location of the first PDU matches the first address included in the command signal, and commanding, by the first PDU controller, a motor of the first PDU according to the command signal in response the first PDU determining that the first address included in the command signal matches the location of the first PDU In various embodiments, the method may further include the step of reading, by the second PDU controller, a second RFID tag to determine a location of a second PDU having the second PDU controller. The method may further include the steps of determining, by the second PDU controller, the location of the second PDU is different than the first address included in the command signal and disregarding, by the second PDU controller, the command signal in response to determining that the location of the second PDU is different than the first address included in the command signal. The first RFID tag may operate at a frequency having a read range of up to one meter.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Cargo handling systems, as disclosed herein, are used to load, move, and unload cargo. The present disclosure describes a cargo handling system having an RFID system for wireless identification of the locations of power drive units, for example, within a cargo deck of an aircraft. Wireless logical-to-physical mapping of power drive units within the cargo handling system may be used for identification and location-based control of the power drive units. Such systems may be used in aircraft cargo systems. However, the systems and methods of the present disclosure may be suitable for use in non-aircraft cargo handling systems.

Figure 1:
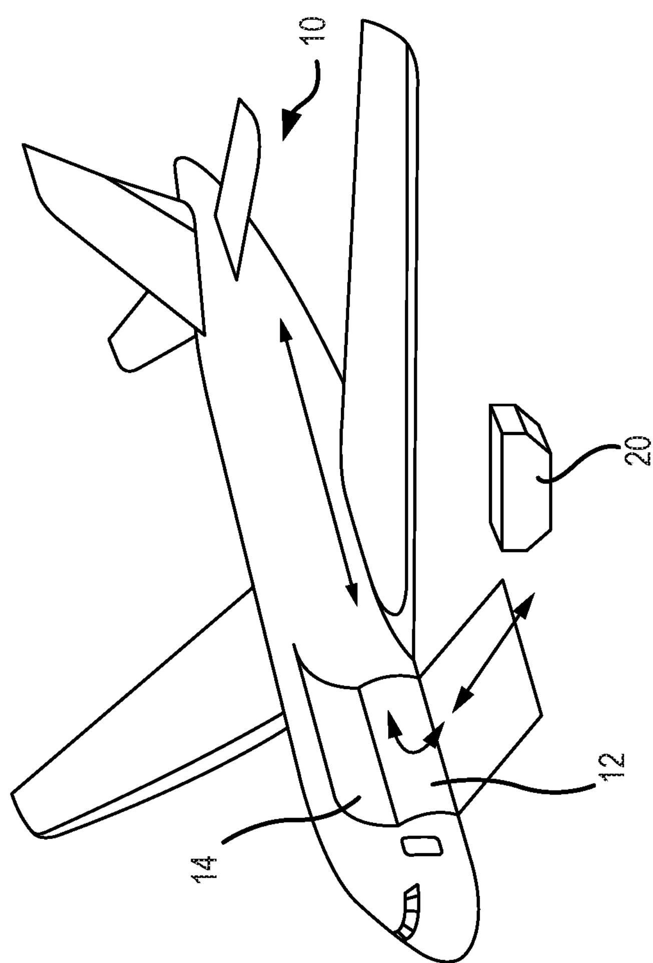
FIG. 1 illustrates a schematic view of an aircraft being loaded with cargo, in accordance with various embodiments.

With reference to FIG. 1, a schematic view of an aircraft 10 having a cargo deck 12 is illustrated, in accordance with various embodiments. The aircraft 10 may comprise a cargo load door 14, for example, at a side of the fuselage structure of the aircraft 10. Cargo 20 may be loaded through cargo load door 14 and onto the cargo deck 12 of the aircraft 10 or unloaded from the cargo deck 12 of the aircraft 10.

Items to be shipped by air are typically loaded first onto specially configured pallets or into specially configured containers. In aviation, those various pallets and/or containers commonly are referred to as unit load devices (ULDs). ULDs are available in various sizes and capacities, and are typically standardized in dimension and shape. Once loaded with cargo items, the ULD is transferred to the aircraft, and is loaded onto the aircraft 10 through the cargo load door 14 using a conveyor ramp, scissor lift, or the like. Once inside the aircraft 10, the ULD is moved within the cargo hold to its final stowage position. Multiple ULDs may be brought on-board the aircraft, with each ULD being placed in its respective stowage and transportation position in on cargo deck 12. After the aircraft 10 has reached its destination, the ULDs are unloaded from the aircraft 10 similarly, but in reverse sequence to the loading procedure. To facilitate movement of a ULD along the cargo deck 12, aircraft 10 may include a cargo handling system 100 as described herein in accordance with various embodiments.

Figure 2:
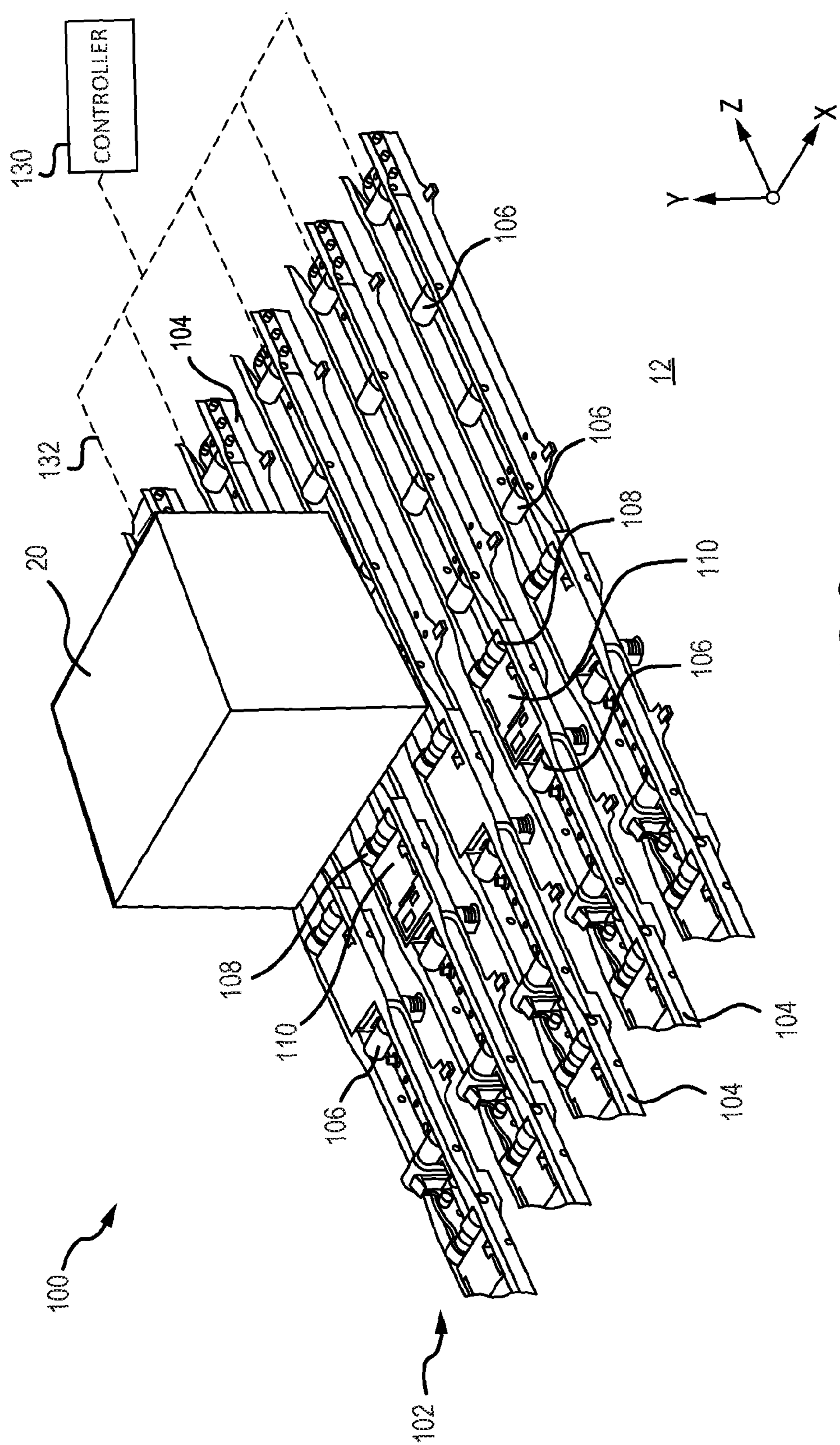
FIG. 2 illustrates a portion of a cargo handling system, in accordance with various embodiments.

With reference to FIG. 2, a portion of a cargo handling system 100 is shown in accordance with various embodiments with xyz axes for ease of illustration. Cargo handling system 100 may comprise a conveyance surface 102 having a plurality of trays 104 supported by cargo deck 12. Trays 104 may be configured to support cargo 20, which may be containerized in pallets or ULDs. Trays 104 may be disposed throughout cargo deck 12 and may support a plurality of conveyance rollers 106, which may be passive rollers. Trays 104 may further support one or more power drive units (PDUs) 110, which may include one or more drive rollers 108, which may be actively controlled by a motor. For example, trays 104 may be positioned longitudinally along cargo deck 12. Conveyance rollers 106 and drive rollers 108 may be configured to facilitate transport of cargo 20 forward and aft along conveyance surface 102 of cargo deck 12.

In various embodiments, cargo deck 12 includes a plurality of PDUs 110 having drive rollers 108 that provide a mechanism upon which cargo 20 is propelled over the conveyance rollers 106. The cargo 20 may contact the drive rollers 108 of PDUs 110 located within the trays 104 to provide motive force for the cargo 20. Each PDU 110 may include an actuator, such as an electrically operated motor, which drives one or more drive rollers 108. In various embodiments, a drive roller 108 may be raised by PDU 110 from a lowered position beneath the conveyance surface 102 to an elevated position above conveyance surface 102. As used with respect to cargo handling system 100, the term "beneath" may refer to the negative y-direction, and the term "above" may refer to the positive y-direction with respect to the provided xyz axes. In the elevated position, a drive roller 108 contacts and drives the overlying cargo 20 that rides on the conveyance rollers 106. Other types of PDUs, which can also be used in various embodiments of the present disclosure, may include a drive roller which is held or bias in a position above the conveyance surface by a spring. PDUs as disclosed herein may be any type of electrically powered rollers that may be selectively energized to propel or drive cargo 20 in a desired direction over the cargo deck 12 of an aircraft 10.

Cargo handling system 100 may include a controller 130 in communication with the PDUs 110 within trays 104 via a plurality of channels 132. Channel 132 may be a data bus, such as a controller area network (CAN) bus and may include one or more CAN busses or multi-CANs. An operator may selectively control operation of PDUs 110 using controller 130. Controller 130 may be configured to activate and/or deactivate the various PDUs 110 of cargo handling system 100. Thus, cargo handling system 100 may receive operator input through controller 130 to control PDUs 110 to manipulate cargo 20 into a desired position on cargo deck 12. Controller 130 may include a general purpose processor, a digital signal processor (DSP), an application specific integrated circuit (ASIC), a field programmable gate array (FPGA) or other programmable logic device, discrete gate or transistor logic, discrete hardware components, or any combination thereof.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Figure 3A:
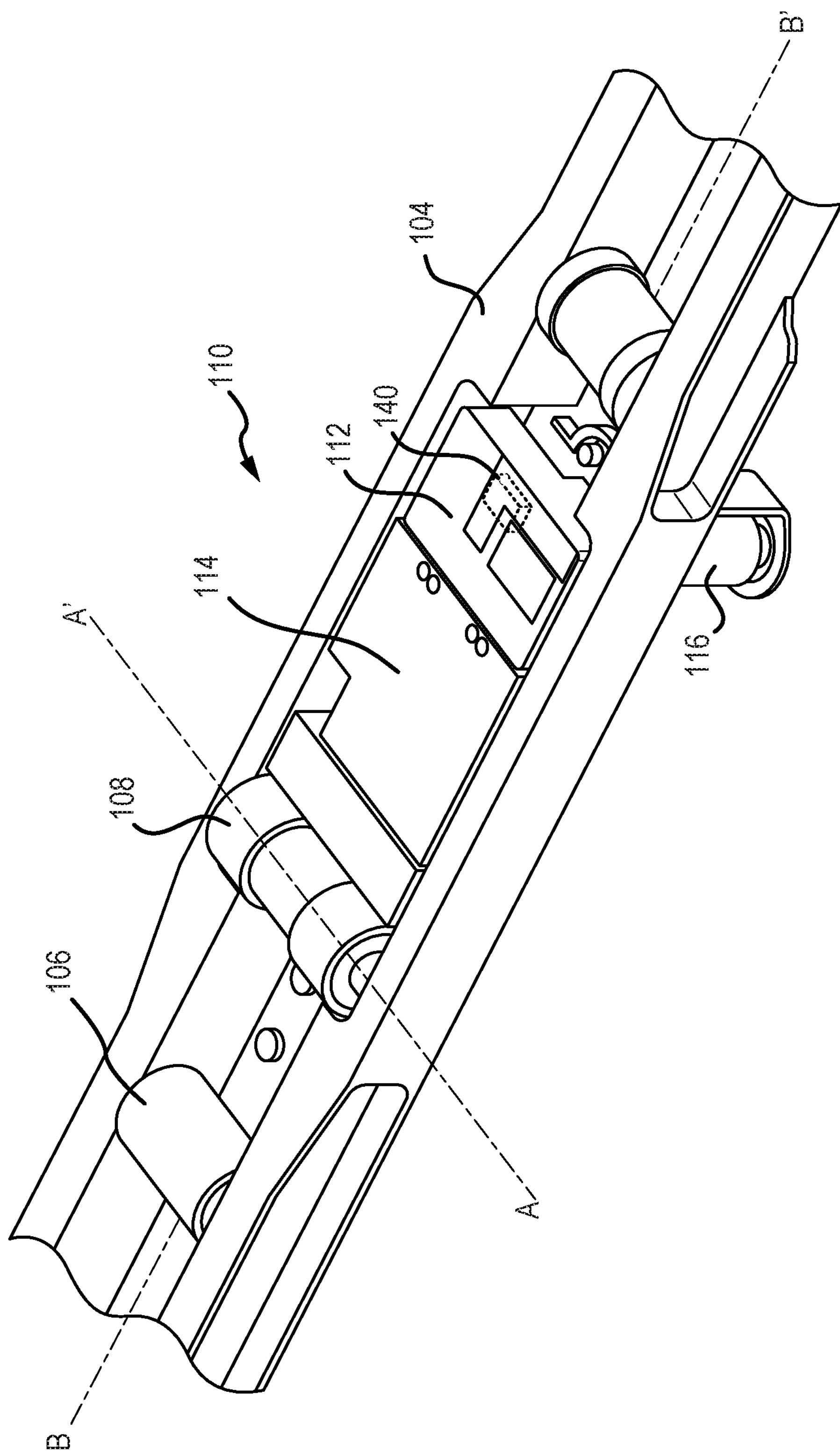
FIGS. 3A and 3B illustrate a portion of a cargo handling system, in accordance with various embodiments.

With reference to FIG. 3A, a PDU 110 disposed in a tray 104 is shown in accordance with various embodiments. PDU 110 may comprise a PDU controller 112, a motor 114, a connector 116, and one or more drive rollers 108 mounted within tray 104. A drive roller 108 may comprise a cylindrical wheel coupled to drive shaft and configured to rotate about an axis A-A'. Drive rollers 108 may be in mechanical communication with the motor 114, which may be, for example, an electromagnetic, electromechanical, or electrohydraulic actuator or other servomechanism. PDU 110 may further include gear assemblies and other related components for turning and/or raising drive rollers 108 so that drive rollers 108 may be positioned above the cargo deck 12 to contact the bottom of cargo 20 (see FIG. 2). In various embodiments, motor 114 may further include a brake.

PDU 110 may rotate drive rollers 108 in one of two possible directions (i.e., forward or reverse) to propel cargo 20 in a direction parallel a longitudinal axis B-B' of tray 104. PDU controller 112 may include a processor and a tangible, non-transitory memory. The PDU processor may comprise one or more logic modules that implement logic to control one or more drive rollers 108. In various embodiments, the PDU 110 may comprise other electrical devices to implement drive logic. Connector 116 may be an electrical connector for coupling the electronics of PDU 110 to a power source and a control source, such as controller 130. Connector 116 have pins and/or slots and may be configured to couple to a wiring harness having pin programming. PDU controller 112 may be configured to receive commands from controller 130 through connector 116. PDU 110 may receive and interpret commands to control motor 114.

PDU controller 112 of PDU 110 may further comprise a radio frequency identification (RFID) reader 140 capable of detecting RFID data. RFID reader 140 may comprise a transmitter, a receiver and/or a transceiver that is configured to transmit and receive power and/or data. RFID reader 140 may be capable of detecting information stored by an RFID tag 142 (see FIG. 3B).

Figure 3B:
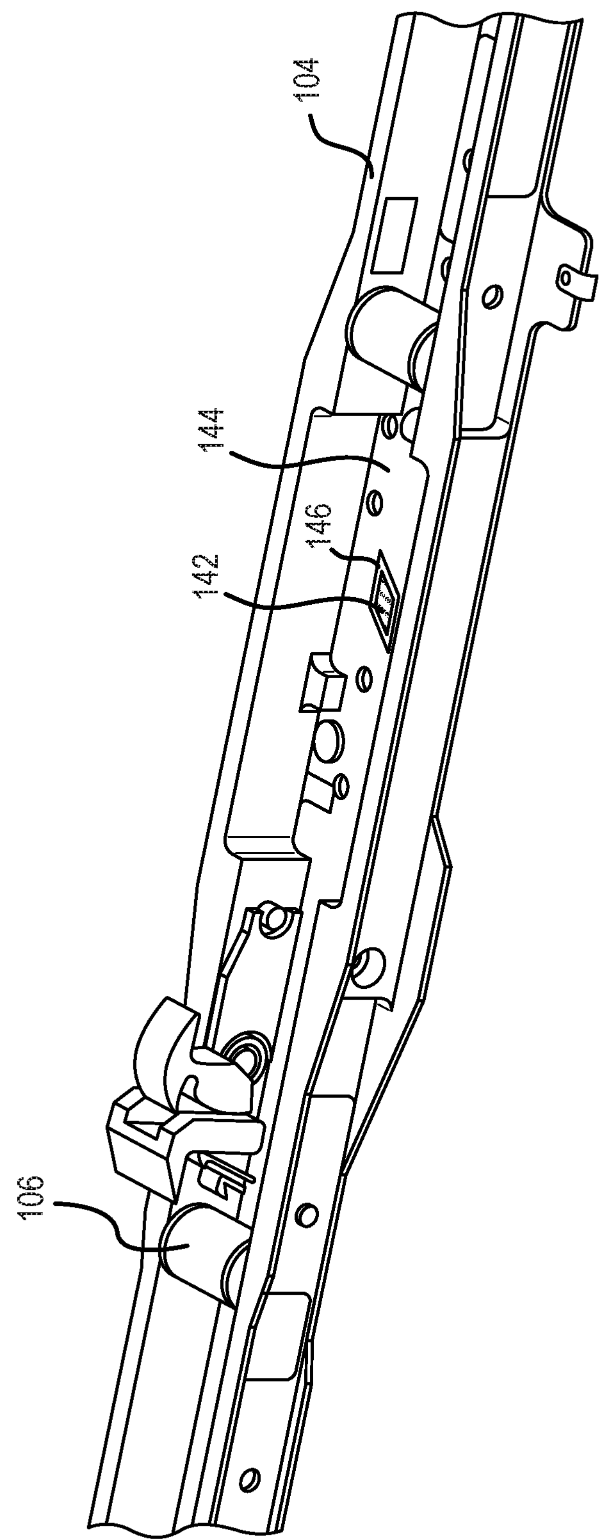

With reference now to FIG. 3B and still to FIG. 3A, a tray 104 is shown in accordance with various embodiments. Tray 104 may include a wireless identification tag, such as an RFID tag 142, couple to the tray 104, for example by surface mounting. In various embodiments, RFID tag 142 may be mounted to a surface 144 of tray 104, embedded within tray 104, or otherwise coupled to tray 104. RFID tag 142 may be a passive device having an integrated circuit which stores information, such as a unique identifier, an address, a serial number, and/or other data, such as location data.

RFID reader 140 may be configured to wirelessly provide the power signal to the RFID tag 142. RFID reader 140 and/or RFID tag 142 may communicate power signals and data signals in both directions via inductive coupling. In response to RFID reader 140 and RFID tag 142 being positioned near each other, power may be transferred from RFID reader 140 to RFID tag 142. RFID tag 142 may be capable of modulating a power signal received from RFID reader 140 and transmitting the modulated power signal to RFID reader 140. RFID reader 140 may be capable of modulating and/or demodulating sent and/or received data signals. In various embodiments, RFID reader 140 may communicate with RFID tag 142 via another wireless system, such as IEEE standard 802.15.1 (Bluetooth), IEEE standard 802.11 (WI-FI), ISO 15693, ISO 14443, ISO/IEC 18000 or the like.

In various embodiments, tray 104 may comprise a metallic or non-metallic material. Transmission of signals between RFID reader 140 and RFID tag 142 may be impeded by a surrounding environment, for example, if RFID tag 142 is coupled to a conductive member such as a tray 104 comprising metal. A ferrite pad 146 may be disposed between the RFID tag 142 and tray 104. Ferrite pad 146 may comprise a non-conductive ferromagnetic ceramic compound having, for example, iron III oxide. In various embodiments, the material of ferrite pad 146 may be selected based in part on an operating frequency of RFID tag 142. The operating frequency of RFID tag 142 may range from 125 kHz to 13.56 MHz and above, as an example, though other operating frequencies are contemplated. For example, ferrite pad 146 may be comprised of nickel-zinc (NiZn) or manganese-zinc (MnZn). The operating frequency of RFID tag 142 may further be selected such that RFID reader 140 in the corresponding tray 104 may communicate with the RFID tag 142, but may not communicate with RFID tags 142 at other tray locations. Thus, the operating frequency of RFID tag 142 may be selected to have a read range of up to 1 meter (39.4 inches), or up to 0.5 meters (19.7 inches), or up to 0.2 meters (7.9 inches), or more particularly, up to 0.1 meters (3.9 inches) or up to 0.05 meters (2.0 inches).

PDU 110 may be a line replaceable unit (LRU), and for example, may be serviced by replacing the PDU 110 within a tray 104. A PDU 110 determines its location on cargo deck 12 by reading the RFID tag 142 of the tray 104 in which PDU 110 is disposed. A PDU 110 may be removed, replaced, or moved and will recognize its current location by reading RFID tag 142. Thus, PDU 110 is configured to respond to commands intended for its location.

Figure 4A:
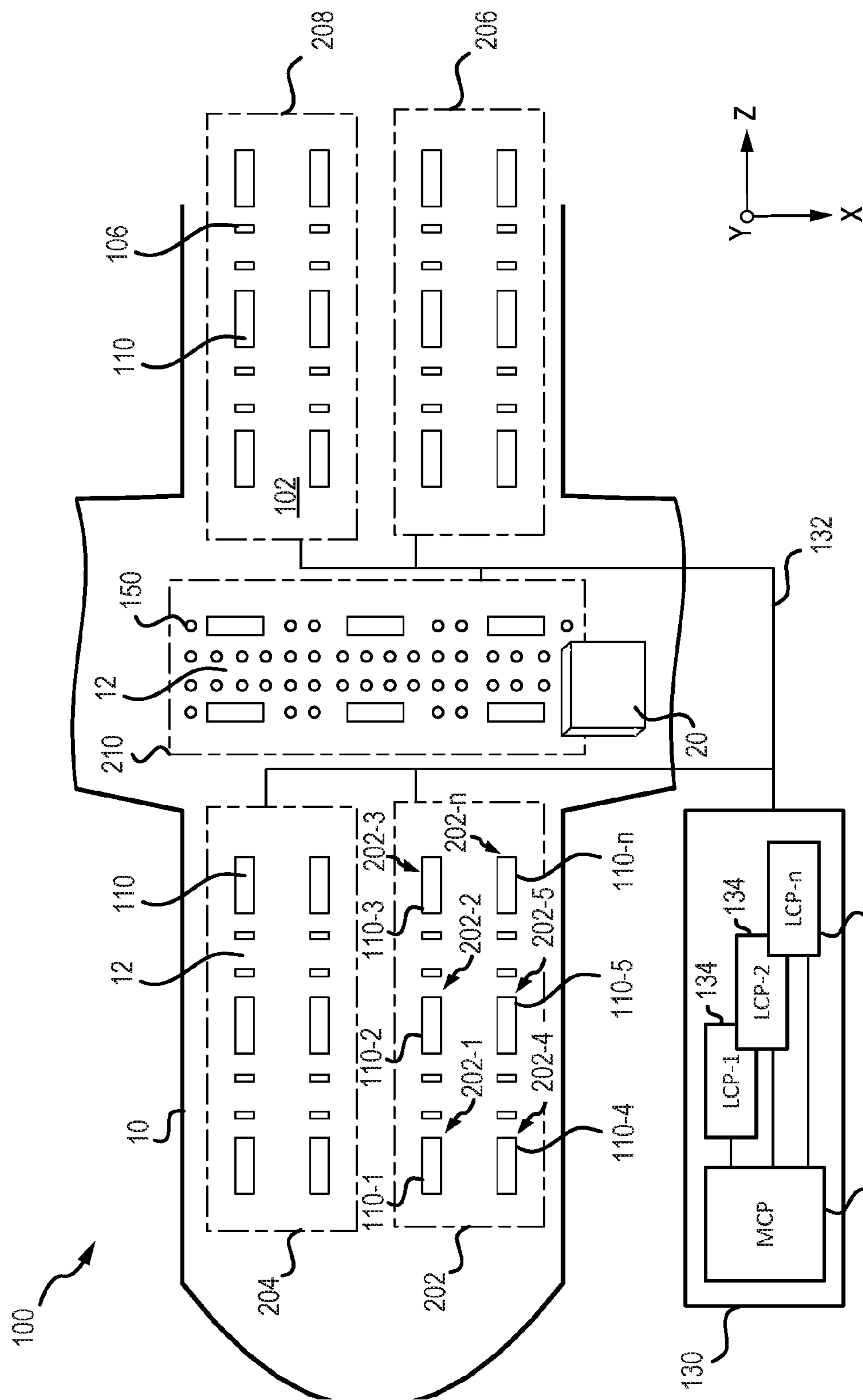
FIGS. 4A and 4B illustrates a schematic view of a cargo deck having a cargo handling system with a plurality of wirelessly identified PDUs, in accordance with various embodiments.

With reference to FIG. 4A, a schematic view of a cargo deck 12 of an aircraft 10 with cargo handling system 100 is shown in accordance with various embodiments. The cargo deck 12 may comprise a plurality of PDUs 110 which are generally arranged in a matrix arrangement, the drive rollers 108 (see FIG. 3) of the PDUs 110 protruding from the conveyance surface 102 of the cargo deck 12 in order to engage with the bottom of the cargo 20 as it is guided onto conveyance surface 102. A plurality of conveyance rollers 106 may be arranged between the plurality of PDUs 110 in a matrix arrangement as well. The conveyance rollers 106 may be passive elements, and may include roller ball units 150 that serve as stabilizing and guiding means for cargo 20 as it is conveyed by PDUs 110. The number of PDUs 110, conveyance rollers 106 and roller ball units 150 are only exemplarily depicted in FIG. 4 and a different number and placement of the PDUs 110, conveyance rollers 106 and roller ball units 150 may be selected as well, depending on the respective application of the cargo deck 12 in the aircraft 10. For example, other aircraft may have three or more parallel longitudinal tracks rather than the H-shape shown in FIG. 4.

Cargo handling system 100 may define a plurality of sections of a conveyance surface 102. In the longitudinal direction, the conveyance surface 102 includes a left track and a right track along which cargo 20 is to be stowed in parallel columns during flight. In the transverse direction, conveyance surface 102 may also be separated into an aft section and a forward section. Thus, the left and right tracks are divided into four sections, two forward sections 202 and 204 and two aft sections 206 and 208. Conveyance surface 102 may also have a lateral section 210, which may move cargo 20 into and out the aircraft 10 and also transfer cargo 20 between the left and right storage tracks.

Each of the aforementioned sections 202, 204, 206, 208, 210 may include a plurality of PDUs 110. Each PDU 110 has a physical location on conveyance surface 102 which corresponds to a logical address within cargo handling system 100. For purposes of illustration, section 202 is shown having PDUs 110-1, 110-2, 110-3, 110-4, 110-5 and **110-*n* at respective locations 202-1, 202-2, 202-3, 202-4, 202-5 and 202-*n*. PDUs 110-1, 110-2, 110-3, 110-4, 110-5 and 110-*n* may be collectively referred to as the PDUs 110 of section 202. Each physical location for a PDU on conveyance surface 102 may have a unique address identifier, which is stored in the RFID tag 142 on the tray 104** at that location.

An operator may control the PDUs 110 using one or more control interfaces of controller 130 configured to permit an operator to selectively control operation of PDUs 110. For example, an operator may selectively control the operation of PDUs 110 through an interface such as a master control panel (MCP) 132. Cargo handling system 100 may also include one or more local control panels (LCP) 134. Master control panel 132 of controller 130 may be in communication with the local control panels 134. Master control panel 132 may be configured to send control signals or command signals to any of PDUs 110, for example, in sections 202, 204, 206, 208, 210. Master control panel 132 may send commands directly to the PDUs 110 and/or to local control panels 134. Local control panels 134 controller 130 may be configured to send command signals to a subset of PDUs 110, such as the PDUs 110 of one or more of sections 202, 204, 206, 208, 210. For example, a first local control panel LCP-1 may be in communication with the PDUs 110 of section 202, a second local control panel LCP-2 may be in communication with the PDUs 110 of section 204, and one or more additional local control panels LCP-n may be in communication with the PDUs 110 of one or more of sections 206, 208, 210. Thus, the master control panel 132 and/or local control panels 134 of controller 130 may be configured to allow an operator to selectively engage or activate one or more PDUs 110 to propel cargo 20 along conveyance surface 102.

Each PDU 110 may be configured to receive a command from any of the control panels of controller 130, including master control panel 132 and local control panels 134. Controller 130 may send a command signal through channel 132, which may be in communication with each of the PDUs 110 in a section. For example, a command signal sent to section 202 may be received by each of PDUs 110-1, 110-2, 110-3, 110-4, 110-5 and **110-*n*. The command signal from controller 130 may include one or more logical addresses, each of which may correspond to a physical address of a PDU 110. Each PDU 110 which receives the command signal may determine if the command signal is intended for that PDU location by comparing its own location to the address included in the command signal. The wireless location identification by PDUs 110 allows connectors 116 (FIG. 3A) to be made smaller, as physical pins of the connectors 116** are not used for addressing.

Figure 4B:
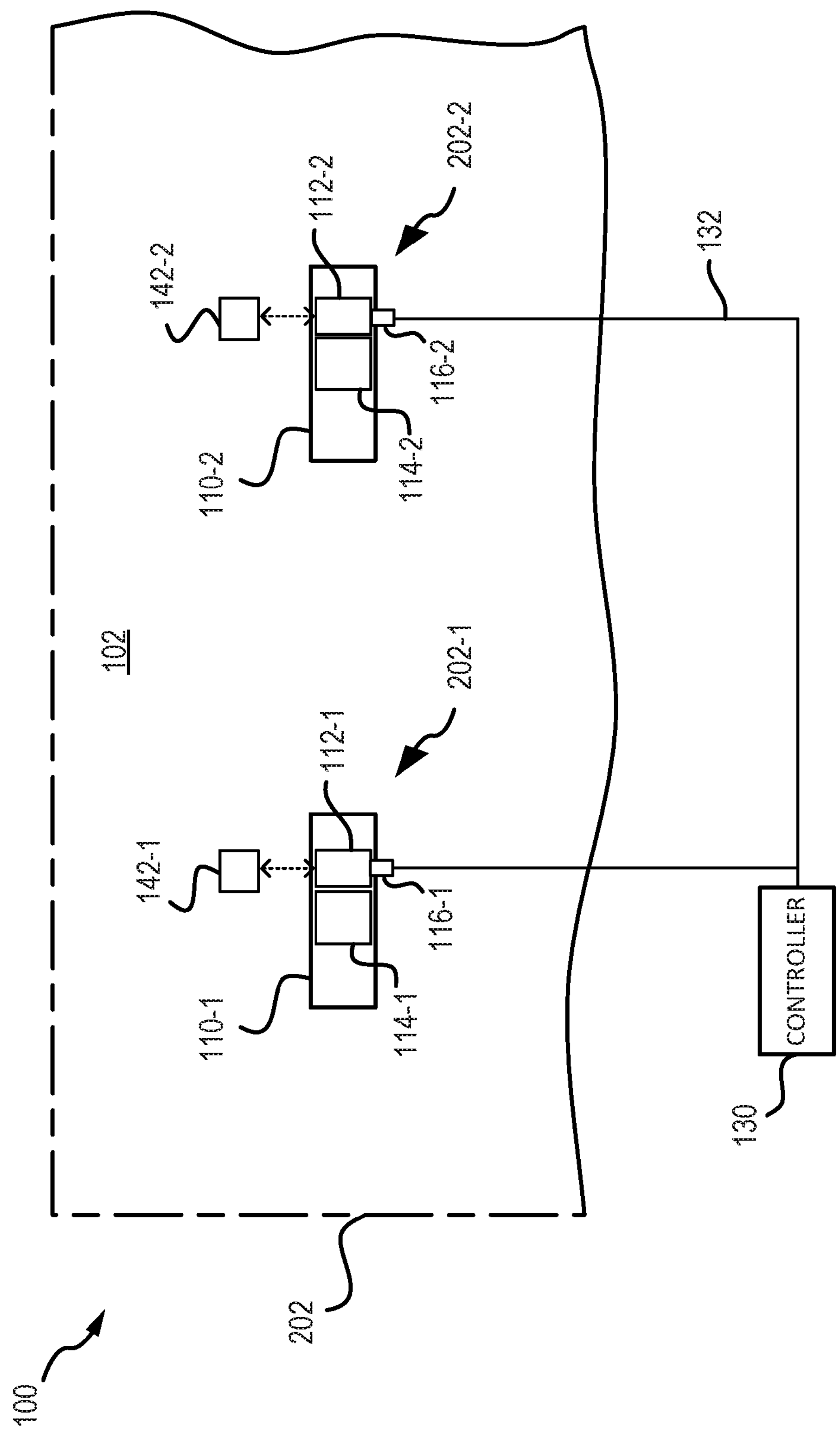

With reference to FIG. 4B, a schematic view of a portion of cargo deck 12 section with cargo handling system 100 is shown in accordance with various embodiments. Controller 130 may send a command signal through channel 132 to at least a first PDU 110-1 and a second PDU 110-2. The command signal may be, for example, an instruction to activate or deactivate the motor, a brake signal for the motor, or a directional instruction indicating the direction the motor should rotate a drive roller. The command signal may include a first address which corresponds to location 202-1.

First PDU controller 112-1 of first PDU 110-1 may receive the command signal through first connector 116-1. In response to first PDU 110-1 receiving the command signal, the first PDU 110-1 may determine its location. A first RFID tag 142-1 may be positioned within a tray at location 202-1 and may store the address information identifying the location 202-1. First PDU controller 112-1 of first PDU 110-1 having an RFID reader 140 may send and receive signals to and from the first RFID tag 142-1 to determine its location. First PDU controller 112-1 may compare its location information to the first address included in the command signal from controller 130. First PDU controller 112-1 may determine whether the location information of the first RFID tag 142-1, which represents the location of first PDU 110-1, matches the first address included in the command signal. In response to the location of first PDU 110-1 matching the first address, the first PDU 110-1 may implement the command signal. First PDU controller 112-1 may respond to the command signal by activating (or deactivating) a first motor 114-1.

Second PDU controller 112-2 of second PDU 110-2 may receive the command signal through second connector 116-2. In response to second PDU 110-2 receiving the command signal, the second PDU 110-2 may determine its location. A second RFID tag 142-2 may be positioned within a tray at location 202-2 and may store the address information for location 202-2. Second PDU controller 112-2 of second PDU 110-2 having an RFID reader 140 may send and receive signals to and from the second RFID tag 142-2 to determine its location. Second PDU controller 112-2 may compare its location information to the first address included in the command signal from controller 130. Second PDU controller 112-2 may determine whether the location information of the second RFID tag 142-2, which represents the location of second PDU 110-2, is different than (i.e., does not match) the first address included in the command signal. In response to the location of second PDU 110-2 being different than the first address included in the command signal, the second PDU controller 112-2 may disregard the command signal.

Figure 5:
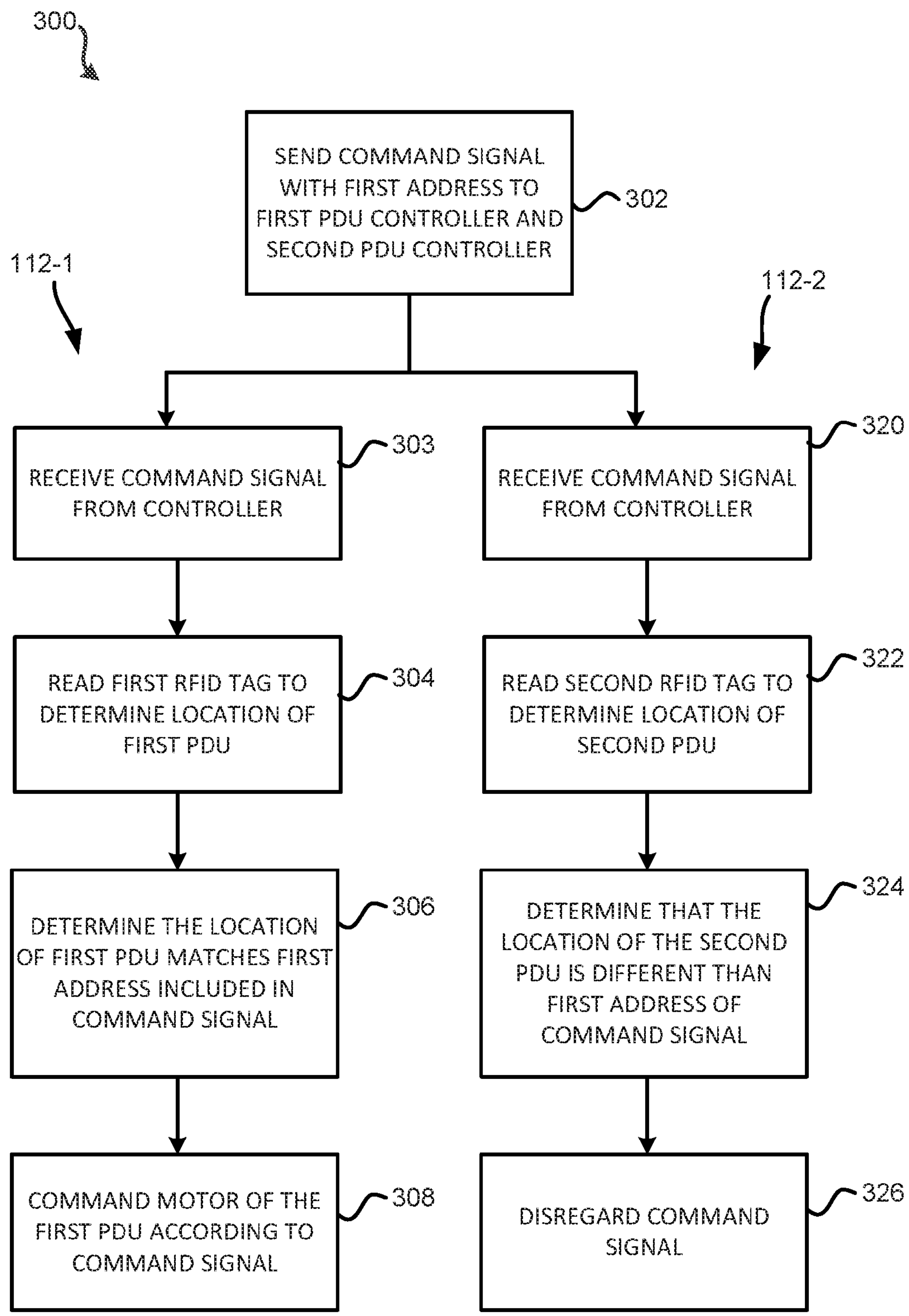
FIG. 5 illustrates method of controlling a cargo handling system in accordance with various embodiments.

With reference to FIG. 5, method of controlling a cargo handling system 100 is shown in accordance with various embodiments. A controller 130 and/or a PDU controller 112, such as first PDU controller 112-1 and/or second PDU controller 112-2, may be capable of carrying out the steps of method 300. Method 300 may comprise the step of sending, by a controller, a command signal to a first PDU controller and a second PDU controller (step 302). The step of sending the command signal to the PDU controllers may be via wired or wireless communication. The command signal may include a first address corresponding to a location of a first PDU having the first PDU controller. In various embodiments, step 302 may further comprise sending the command signal through a wired connection to the first PDU controller and the second PDU controller. Method 300 may comprise the steps of receiving, by the first PDU controller, the command signal from the controller (step 303), reading, by the first PDU controller, a first RFID tag to determine the location of the first PDU (step 304), determining, by the first PDU controller, the location of the first PDU matches the first address included in the command signal (step 306), commanding, by the first PDU controller, a motor of the first PDU according to the command signal in response the first PDU determining that the first address included in the command signal matches the location of the first PDU (step 308). For example, the first PDU controller may receive the command signal through a wired connection and may identify the location of the first PDU by wireless connection. The wireless identification of PDU location allows the wired connectors of cargo handling system 100 be made smaller and/or to use fewer pin connections.

Method 300 may further comprise the steps of receiving, by the second PDU controller, the command signal from the controller (step 320), reading, by the second PDU controller, a second RFID tag to determine a location of a second PDU having the second PDU controller (step 320), determining, by the second PDU controller, the location of the second PDU is different than the first address included in the command signal (step 322), determining, by the second PDU controller, the location of the second PDU is different than the first address included in the command signal (step 324), and disregarding, by the second PDU controller, the command signal in response to determining that the location of the second PDU is different than the first address included in the command signal (step 324).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo handling system comprising a power drive unit (PDU), the PDU comprising:
- a motor; and
- a PDU controller in communication with the motor and configured to receive a command signal including an address corresponding to a location of the PDU, the PDU controller comprising:
  - a radio frequency identification (RFID) reader, wherein the PDU controller is configured to determine the location of the PDU by reading an RFID tag.

2. The PDU of claim 1, wherein the PDU controller is configured to determine whether the address included in the command signal matches the location of the PDU.

3. The PDU of claim 2, wherein the PDU controller is configured to command the motor in response to the location of the PDU matching the address included in the command signal.

4. The PDU of claim 2, wherein the PDU controller is configured to disregard the command signal in response to the location of the PDU being different than the address included in the command signal.

5. The PDU of claim 1, wherein the RFID tag operates at a frequency having a read range of up to one meter.

6. The PDU of claim 1, further including a connector coupled to the PDU controller, the connector configured to couple to a wiring harness having pin programming.

7. A cargo handling system, comprising:
- a tray;

a first radio frequency identification (RFID) tag coupled to the tray, the first RFID tag including a location information identifying a location of the tray;

a first power drive unit (PDU) disposed in the tray, the first PDU comprising a first PDU controller; and a first tangible, non-transitory memory configured to communicate with the first PDU controller, the first tangible, non-transitory memory having instructions stored thereon that, in response to execution by the first PDU controller, cause the first PDU controller to perform operations comprising:

receiving, by the first PDU controller, a command signal including a first address corresponding to a location of the first PDU, reading, by the first PDU controller, the first RFID tag to determine the location of the first PDU, and determining, by the first PDU controller, whether the location of the first PDU matches the first address included in the command signal.

8. The cargo handling system of claim 7, wherein the first PDU further includes a motor coupled to the first PDU controller, wherein the motor is coupled to a drive roller.

9. The cargo handling system of claim 8, wherein the operations further comprise commanding, by the first PDU controller, the motor of the first PDU according to the command signal in response the first PDU determining that the first address included in the command signal matches the location of the first PDU.

10. The cargo handling system of claim 7, further including a connector coupled to the first PDU controller, the connector configured to couple to a wiring harness having pin programming.

11. The cargo handling system of claim 7, wherein the first PDU controller comprises an RFID reader.

12. The cargo handling system of claim 7, further including a ferrite pad disposed between the tray and the first RFID tag.

13. The cargo handling system of claim 7, wherein the first RFID tag operates at a frequency having a read range of up to one meter.

14. The cargo handling system of claim 7, further including a second PDU having a second PDU controller.

15. The cargo handling system of claim 14, further including a second tangible, non-transitory memory configured to communicate with the second PDU controller, the second tangible, non-transitory memory having the instructions stored thereon that, in response to execution by the second PDU controller, cause the second PDU controller to perform operations comprising:

reading, by the second PDU controller, a second RFID tag to determine a location of the second PDU.

16. The cargo handling system of claim 15, wherein the operations of the second PDU controller further comprise:

determining, by the second PDU controller, the location of the second PDU is different than the first address included in the command signal; and disregarding, by the second PDU controller, the command signal in response to determining that the location of the second PDU is different than the first address included in the command signal.

17. A method of controlling a cargo handling system, comprising:

sending, by a controller, a command signal to a first power drive unit (PDU) controller and a second PDU controller, the command signal including a first address corresponding to a location of a first PDU having the first PDU controller;

reading, by the first PDU controller, a first radio frequency identification (RFID) tag to determine the location of the first PDU;

determining, by the first PDU controller, the location of the first PDU matches the first address included in the command signal; and commanding, by the first PDU controller, a motor of the first PDU according to the command signal in response the first PDU determining that the first address included in the command signal matches the location of the first PDU.

18. The method of claim 17, further including reading, by the second PDU controller, a second RFID tag to determine a location of a second PDU having the second PDU controller.

19. The method of claim 18, further including:

determining, by the second PDU controller, the location of the second PDU is different than the first address included in the command signal; and disregarding, by the second PDU controller, the command signal in response to determining that the location of the second PDU is different than the first address included in the command signal.

20. The method of claim 17, wherein the first RFID tag operates at a frequency having a read range of up to one meter.

* * * * *